3,107,143
METHOD OF PREPARING AN ALKALI METAL ZIRCONATE
James R. Russell, Pensacola, Fla., assignor, by mesne assignment, to Pittsburgh Plate Glass Company
No Drawing. Filed Aug. 7, 1958, Ser. No. 753,617
4 Claims. (Cl. 23—51)

This invention relates to an improvement in the method of recovering zirconium from zircon sand. Zircon sand is one of the more common ores from which zirconium may be recovered. It is predominantly a compound of zirconium and silicon, which compound has the approximate composition $ZrO_2SiO_2$. The silica is chemically bound with the zirconium.

In the recovery of zirconium from such an ore, it is necessary to treat the ore in order to break the chemical bond between the silica and the $ZrO_2$. It has been recognized that this may be effected by heating together a mixture of zircon sand and an alkali metal hydroxide, such as sodium hydroxide. The result is to convert the silica component to a water soluble form, probably as sodium silicate, so that upon water extraction, the silica can largely be removed, leaving a product which is largely $ZrO_2$ as an undissolved residue. This $ZrO_2$ may then be extracted with various acids, such as hydrochloric acid, sulphuric acid, acetic acid or other water soluble inorganic acid, in order to solubilize the $ZrO_2$ component.

In the practice of this process, there are several difficulties encountered. In the first place, the mixture of zircon and caustic is quite corrosive and consequently serious corrosion of equipment takes place. This may even be so severe as to cause early break-down in the equipment used to heat the caustic soda-zircon mixture. Furthermore, in the course of the operation, serious caking of the mixture can take place. This frequently makes difficult the performance of the operation in a continuous manner.

According to the present invention, an improved process for reacting an alkali metal hydroxide, such as sodium hydroxide, with zircon ore has been provided. In the practice of a typical embodiment of the invention herein contemplated, zircon ore in pulverulent state is heated and an aqueous solution of an alkali metal hydroxide is added to the heated zircon at substantially the temperature at which reaction occurs. The alkali metal hydroxide solution normally contains about 10 to 75 percent by weight of the alkali metal hydroxide and, to effect satisfactory contact and reaction of the alkali with the zircon, the temperature of the alkali metal hydroxide solution being fed to the hot zircon should be at or below the temperature at which the solution boils, preferably below 150 to 200° C. As a consequence, the alkali metal hydroxide reacts with the zircon, producing a readily friable product. Hereinafter, products which are produced by this reaction of an alkali metal hydroxide with zircon ore will, for convenience, be referred to as "frit" or "alkali metal zirconate" or "sodium zirconate."

The temperature to which the zircon ore is heated depends upon the desired performance of the process. In the preferred embodiment, the zircon is heated to a temperature at which zircon reacts with alkali metal hydroxide, for example, 450 to 500° C. or above. In such a case, the alkali metal hydroxide reacts with the zircon as the alkali metal hydroxide is added or shortly thereafter.

The practice of this process offers a number of advantages. Danger of corrosion during the preheat period is substantially minimized since the product contains no alkali metal hydroxide during such period. Moreover, since the sodium hydroxide or like alkali metal hydroxide is added after the sand has reached at least about 300° C., and preferably above 450° C., any tendency of the sodium hydroxide to segregate from the ore is appreciably minimized. Thus, it has been found that when equal parts by weight of aqueous sodium hydroxide and zircon ore are heated gradually from room temperature up to a temperature of 500° C. or above, the mixture passes through a liquid phase and the sodium hydroxide tends to melt at a temperature of about 320° C. and to collect in the lower portion of the reactor. This is objectionable for several reasons. In the first place, sodium hydroxide in molten state is quite corrosive and therefore the crucible or other equipment used can be severely attacked by the molten caustic during the period of heating up to reaction temperature. Secondly, segregation of the sodium hydroxide can tend to cause incomplete reaction. Moreover, the formation of a liquid phase during the course of the heating tends to cause the reaction mixture to cake and/or agglomerate severely, thus making handling more difficult.

In contrast, in the present process, sodium hydroxide is consumed rapidly, often substantially as rapidly as it is added, by supplying it to the reaction mixture substantially at the temperature at which the reaction takes place. Consequently, the sodium hydroxide or like alkali metal hydroxide is present in the reaction mixture for but a very short period of time. This means that there is only a very short period of time that the mixture is seriously corrosive.

The rate of addition of the alkali metal hydroxide solution to the heated sand is controlled so that the mixture remains solid and does not pass into the form of an essentially liquid slurry or mixture. This is due to the fact that, as sodium hydroxide solution is added, the water therein vaporizes rapidly and the alkali metal hydroxide is reacted essentially as rapidly as added or is so diluted with unreacted zircon sand or previously formed frit that contact of the caustic with the walls of the vessel is substantially minimized. Thus, the reaction mixture does not convert to a fluid state but remains as either a friable, pulverulent mass or as a readily workable plastic mass.

The process may be conducted in a continuous manner by feeding the sand into the preheat section of an inclined, horizontally directed rotary kiln where it is preheated at atmospheric pressure or below to a temperature above about 300° C., preferably above 450–500° C. and usually in the range of 550 to 650° C. Thereafter, the hot zircon is caused to pass through the remainder of the kiln while heating the mixture, and the alkali metal hydroxide solution is added to the sand at one or several places located longitudinally of the kiln. As a consequence, sodium zirconate frit is formed at the point where the initial introduction of alkali metal hydroxide is produced and, as the mixture tumbles, predominantly forming a bed along the lower portion of the kiln tube, it is delivered to a point further down the kiln and gradually increases in frit concentration by reaction of the alkali metal hydroxide with the zircon.

As it reaches the second point of introduction of alkali metal hydroxide, the reaction mixture thus comprises a mixture of frit and ore, and the frit serves to prevent the mixture from becoming liquid. In the practice of a process of this character, the alkali metal hydroxide may be introduced into the kiln at several points (2, 3, or more) spaced longitudinally in the kiln and in the direction of flow toward the exit end of the kiln.

In order to cause the solution to contact the zircon intimately, the temperature of the solution should be below or at least not over its boiling point. Usually, this temperature should be below about 150 to 200° C. The solution is delivered to the hot zircon in the kiln at one or several points along the length of the kiln. This can be accomplished effectively by providing a water-cooled inlet tube or tubes which run into the kiln, with outlets, sprays or the like at spaced points along the kiln to spray or otherwise deposit the solution upon the hot zircon. In order to prevent the solution from overheating, the inlet tube for the alkali metal hydroxide solution is jacketed for its entire length in the kiln with a water-cooled jacket through which cooling water is circulated. To avoid undesirable dispersal of the caustic solution to areas where the walls of the kiln are exposed, the sprays are downwardly directed against the bed of zircon being heated. Normally, a dam is provided in the kiln in order to provide a bed of zircon, or zircon and frit, at least one to two inches deep.

The amount of alkali metal hydroxide solution that is used should be enough to react with a substantial amount of the zirconium ore, but should not be so large as to cause production of a liquid reaction mixture. That is, the mixture should remain in either an essentially pulverulent state or at least as a plastic or semi-plastic mass in which the reaction mixture as a whole does not have the properties of a liquid. Where the alkali metal hydroxide is added in increments or where the temperature is high enough to ensure very rapid reaction, e.g., 550–700° C., the amount of alkali metal hydroxide may be in substantially stoichiometric amounts. That is, in the case of sodium hydroxide, it may range from about 0.8 to 2 (rarely over 1.5) pounds per pound of zirconium ore. While smaller amounts can be added, only a portion of the zircon is reacted in such a case. Equivalent amounts of potassium hydroxide or other alkali metal hydroxide may be used in lieu of sodium hydroxide.

For best results, it is advantageous to spray the sodium hydroxide solution through narrowed slots which produce a flat spray having roughly the shape of a fan. These sprays are dispersed so that the fan spray extends lengthwise of the kiln rather than crosswise. By this means a few longitudinally dispersed sprays can deposit a nearly continuous band of caustic solution upon zircon and reaction mixture passing through the rotary kiln.

The zircon ore which is subjected to treatment normally is relatively finely divided, usually having a particle size below about 50 mesh.

The following example is illustrative:

*Example I*

The process was conducted using zircon sand containing about 66 percent by weight of zirconium, calculated as $ZrO_2$, and 32 percent by weight of $SiO_2$, the zircon having a particle size below 50 mesh. The kiln used was an externally fired, rotating tube, 26 feet long and having an internal diameter of 3 feet. The kiln was heated to a bed temperature of 1050 to 1150° F.

Dry zircon was fed to the kiln, at the entry end thereof, continuously at a rate of 6.5 pounds per minute. An aqueous solution containing about 50 percent by weight of NaOH was fed into the kiln through 8 sprays which were individually supplied by 8 tubes each ¼ inch in diameter from a common source of sodium hydroxide solution. The first spray was located at 5 feet from the feed end of the kiln, and the other sprays were spaced two feet apart in a row downstream of the kiln from the first spray nozzle. These tubes were enclosed in a cooling tube 4 inches in diameter which thus provided a cooling jacket extending along the length of the kiln. The sprays delivered a downwardly directed flat spray extending longitudinally of the kiln, the angle of each spray being about 65 degrees, so that the sprays did not intersect. The sodium hydroxide was introduced into the sprays at a total rate of about 1.3 gallons per minute, each spray being supplied with approximately an equal amount of sodium hydroxide solution. The temperature of the sodium hydroxide solution was held below the boiling point thereof by means of water circulating through the cooling jacket at a rate of about 10 gallons per minute. A dam ring was provided in the kiln to ensure provision of a bed depth of about 2 to 5 inches of the reacting zircon, so that the caustic was largely consumed before it reached the kiln wall.

The alkali metal zirconate produced was withdrawn from the exit end of the kiln at a temperature of about 500° F. This process was continued, with only minor interruption, for several months. No serious agglomeration and no serious corrosion or embrittlement of the equipment took place. Approximately 90 percent by weight of the zircon introduced was converted to sodium zirconate.

It will be understood that the alkali metal hydroxide may be added to the zircon while the zircon is preheated at as low as about 300° C., although the zircon preferably should be above 450° C. While the reaction mixture may cool somewhat during addition of alkali metal hydroxide, such cooling rarely reduces the temperature below 300° C. In any case, the resulting mixture is further heated to optimum reaction temperature (above about 450 to 500° C.).

While the invention has been described with particular reference to use of sodium hydroxide in the practice thereof, other alkali metal hydroxides, including the hydroxides of potassium or lithium, may be used in equivalent amounts in the practice of the above described example and embodiments in lieu of all or a part of the sodium hydroxide used therein.

Although the present invention has been described with reference to the specific details of certain embodiments, it is not intended that such details shall be regarded as limitations upon the scope of the invention except insofar as included in the accompanying claims.

What is claimed:

1. A method of preparing an alkali metal zirconate which comprises introducing zircon into a rotary kiln, heating the zircon to at least 300° C. to 500° C. in the kiln, and introducing into the kiln from an end thereof an aqueous solution of sodium hydroxide and spraying said solution onto the zircon at spaced points along the kiln to the heated zircon in a spray which is elongated in cross-section, the spray being directed so that the elongated portion of the spray is longitudinal of the kiln, while maintaining the temperature of said solution below the boiling point thereof and thereby producing alkali metal zirconate while substantially averting corrosion and caustic embrittlement of the kiln.

2. A method of preparing an alkali metal zirconate which comprises introducing zircon into a rotary kiln and heating the zircon to at least 300° C. to 500° C. in the kiln, and introducing into the kiln from an end thereof an aqueous solution of alkali metal hydroxide, which contains 10 to 75 percent by weight of alkali metal hydroxide, and spraying said solution onto the zircon at spaced points along the kiln to the heated zircon in a spray which is elongated in cross-section, the spray being directed so that the elongated portion of the spray is longitudinal of the kiln, while maintaining the temperature of said solution below the boiling point thereof and thereby producing alkali metal zirconate while substantially averting corrosion and caustic embrittlement of the kiln.

3. The process of claim 1 wherein the zircon is heated above 450° C. and the sodium hydroxide solution is sprayed downwardly on a bed of said zircon which is at least one inch deep.

4. The process of claim 3 wherein the sodium hydroxide solution is an aqueous solution which contains 10 to 75 percent by weight of sodium hydroxide.

References Cited in the file of this patent

UNITED STATES PATENTS

| | | |
|---|---|---|
| 1,527,470 | Cooper | Feb. 24, 1925 |
| 2,603,556 | Miller | July 15, 1952 |
| 2,696,425 | Kistler | Dec. 7, 1954 |
| 2,828,187 | Evans | Mar. 25, 1958 |
| 2,890,949 | Blanton et al. | June 16, 1959 |

OTHER REFERENCES

Beyer et al.: "Caustic Treatment of Zircon Sand," publ. by U.S.A.E.C. Tech. Information Service, Oak Ridge, Tenn., Aug. 17, 1954, ISC-437 (Rev.).